Sept. 9, 1969  R. J. LIVINGSTON  3,466,006
SAFETY DEVICE FOR AUTOMATIC WASHERS AND THE LIKE
Filed April 7, 1967  2 Sheets-Sheet 1
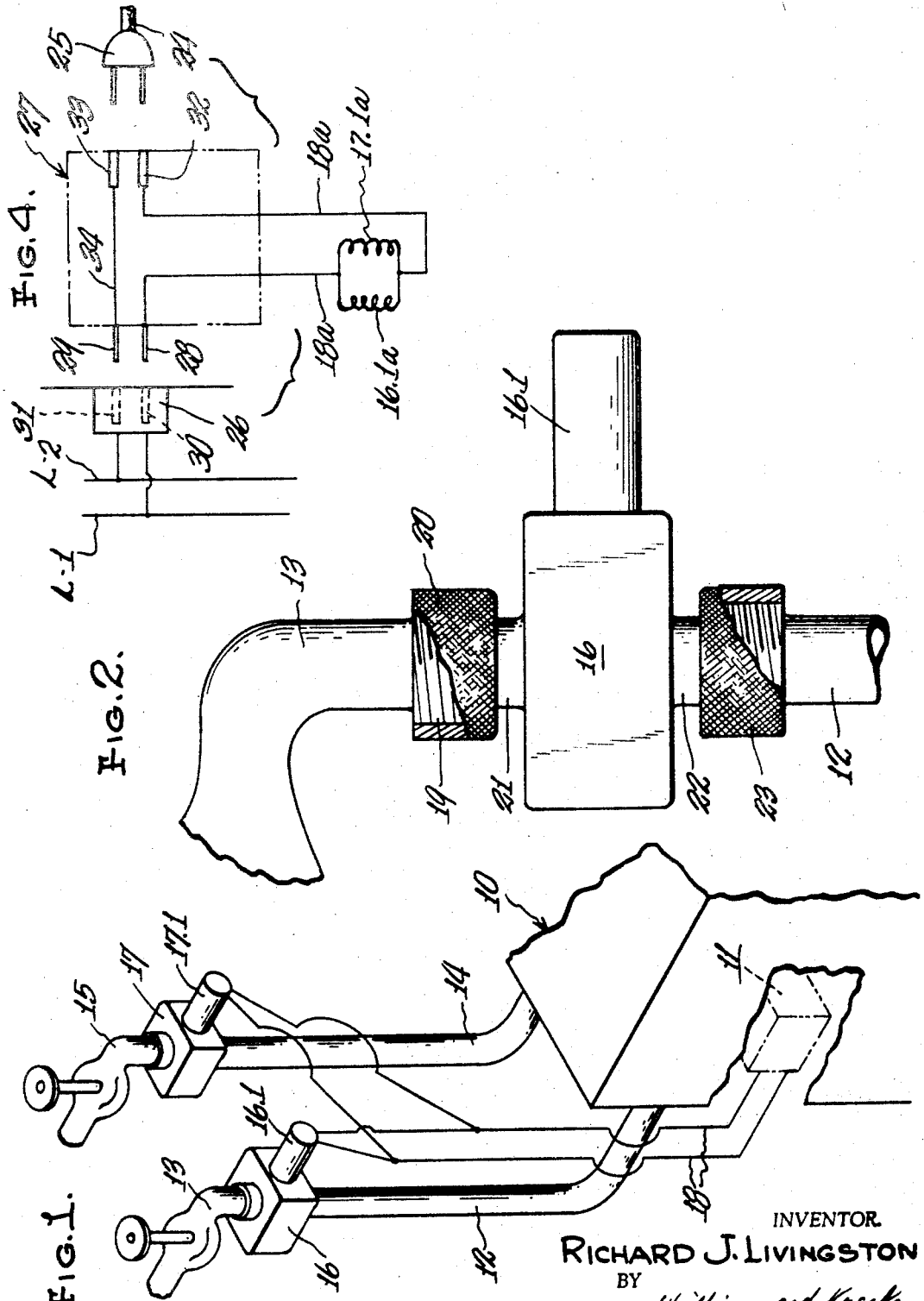
INVENTOR.
RICHARD J. LIVINGSTON
BY
*Williams and Kreski*
ATTORNEYS Sept. 9, 1969  R. J. LIVINGSTON  3,466,006
SAFETY DEVICE FOR AUTOMATIC WASHERS AND THE LIKE
Filed April 7, 1967  2 Sheets-Sheet 2
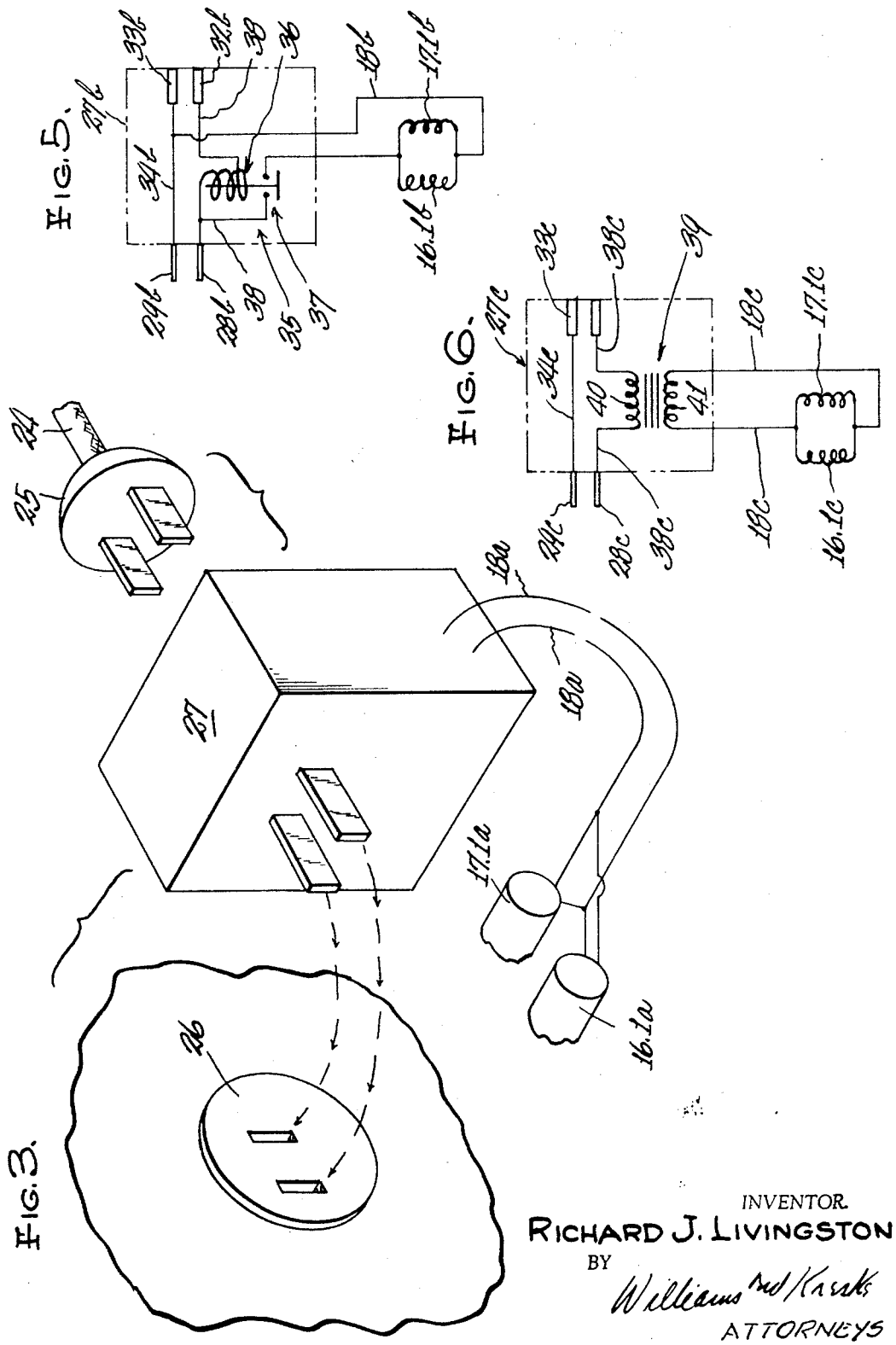
INVENTOR.
RICHARD J. LIVINGSTON
BY
Williams and Krask
ATTORNEYS United States Patent Office 3,466,006
Patented Sept. 9, 1969

3,466,006
SAFETY DEVICE FOR AUTOMATIC
WASHERS AND THE LIKE
Richard J. Livingston, R.D. 2,
West Middlesex, Pa. 16159
Filed Apr. 7, 1967, Ser. No. 629,290
Int. Cl. F16k 31/02; B08b 3/00
U.S. Cl. 251—129    5 Claims

ABSTRACT OF THE DISCLOSURE

The present invention disposes a valve intermediate the flexible water supply hose of an automatic washer and the faucet to which it is usually connected and provides for automatic operation of such valve in coordination with the operating cycle of the washer. The invention further provides for coordinating valve operation with that of the washer by means including an adaptor interposed between the power lead of the washer and the electrical outlet which supplies power thereto.

PREAMBLE

Automatic clothes washers, whether installed in homes, apartments or in self-serve, public laundries, are normally connected to pressurized sources of both hot and cold water by respective flexible hoses. Virtually always, such hoses are operably connected to respective hot and cold water faucets or cocks from which the water required during the washing and rinsing cycles of the washer may be drawn. Flow of water into the washer, of course, is controlled by automatic valves within the washer cabinet in accordance with its cycle of operation.

Many home owners are aware that it is advisable to turn off both the hot and cold water supply faucets to the washer when it is not in use so as to avoid maintaining continuous water pressure within the flexible, water supply hoses. If this procedure is followed, the rupturing of a water supply hose is a very rare occurrence. Unfortunately, this cannot always be done since it is not at all unusual for the user of an automatic washer to leave it unattended for a considerable time after it has finished its work. During the interval while the faucets are turned on and the washer is unattended, it is always possible for a hose to rupture with the possibility of considerable water damage before the ruptured hose is discovered and the faucet is turned off.

While the home owner can protect himself to a considerable degree by making certain that the water supply faucets to the washer are turned off at all times the washer is not in use, a much more serious problem is presented where the washer is installed in an apartment. Many tenants are notoriously careless about taking care of rented premises and, a landlord who would expect his tenant to take the above precaution would indeed be naive. Compounding the problem in apartments is the fact that many washers are installed on an upper floor and/or where there is no floor drain for receiving escaping water and in such case, even a relatively small amount of water escaping from a ruptured hose could cause great damage to the premises.

A third situation where the problem is acute is in self-service laundries. Many of these establishments are open 24 hours a day but with no attendant during the late evening and early morning hours. If a water supply hose should break in one of these establishments, many hours could elapse before discovery. In view of the many machines present in most self-service laundries, the possibility of a ruptured hose is markedly increased.

By use of the present invention, the only time a washer water supply hose is subjected to water pressure is during the relatively short operating cycle of the washer. Accordingly, the life of the hose will be greatly extended and, if a hose should rupture, this would only cause water loss during the washer operating cycle. Moreover, the likelihood is great that if a hose ruptures during the washer operating cycle and especially at the initial stage thereof, the user will immediately become aware thereof so that water loss can immediately be stopped by turning the washer off.

These and other advantages of the present invention will readily become apparent from a study of the following description and from the drawings appended hereto, and in these drawings:

FIGURE 1 is a generally diagrammatic perspective view of the invention in combination with a fragmentarily shown automatic washer together with hot and cold water supply faucets, FIGURE 2 is a fragmentary, enlarged elevational view of a detail seen in FIGURE 1, parts on the near side being broken away for clarity, FIGURE 3 is a reduced size fragmentary, exploded perspective view of certain details, FIGURE 4 is a fragmentary, diagrammatic view of one embodiment of the invention, and FIGURES 5 and 6 are diagrammatic views similar to FIGURE 4 but illustrating other embodiments of the invention.

DETAILED DESCRIPTION

With reference first to FIGURE 1, there is fragmentarily disclosed an automatic clothes washer 10 having a control switch 11 which may be the usual timer that operates the washer through its various operating cycles. Washer 10 has a hot water supply hose 12 adapted to be connected to a hot water faucet 13 and a cold water supply hose 14 adapted to be connected to a cold water faucet 15. Although not shown, the washer 10 normally has internal electrically operated valves which control flow of water from the hoses 12, 14 to the interior of the washer as required by its operating cycles.

Interposed between the hose 12 and the faucet 13 is a valve 16 having an electrical actuator 16.1. A similar valve 17 having an electrical actuator 17.1 is interposed between the hose 14 and its faucet 15. Suitable electrical leads 18 extend from the washer control 11 to operate the valve actuators as next to be described.

Assuming that the washer 10 is not in use, no current will flow to the valve actuators 16.1, 17.1 and thus the valves 16, 17 will be in normally closed relation wherein they interrupt water flow between the faucets and respective washer hoses. Accordingly, the washer supply hoses will not be continually subjected to the water pressure present at the faucets even though the latter remain open.

When the washer is to be used, its control 11 will be suitably actuated by the user. This will automatically feed electrical energy to the valve actuators 16.1, 17.1 via the leads 18 to shift respective valves 16, 17 to open position wherein water may flow from the faucets 13, 15 through respective hoses 12, 14 to the washer as required by its operating cycle and as controlled by the washer's internal, water control valve previously mentioned.

When the washer has completed its cycle of operation, it will automatically shut itself off. This will terminate flow of electrical energy to the valve actuators 16.1, 17.1 thus closing the valves 16, 17 and interrupting communication between the faucets and the washer supply hoses until such time as the washer is once again placed in operation.

It is to be understood that while control 11 has been disclosed as energizing the valve actuators 16.1, 17.1 when the washer commences its cycle of operation and de-energizing them when the cycle is completed, such control could as well energize and de-energize such actuators appropriately during certain portions of the operational cycle. For example, the actuators could be de-energized after the final rinse since, although the washer still must operate through the spin dry portion of its cycle, further water will not be required until such time as a new cycle of operation is initiated.

Turning now to FIGURE 2 wherein the valve 16 is shown in greater detail, it will be seen that the faucet 13 has an externally threaded outlet portion 19 with which an internally threaded collar 20 on an inlet pipe 21 of the valve 16 is operably engaged. An externally threaded valve outlet pipe 22 is adapted for operable engagement with the usual internally threaded collar 23 on the hose 12. A similar arrangement, of course, will be provided by the faucet 15, the valve 17 and the hose 14.

While the construction thus far described is quite practical, a drawback inherent therein is that electrical connections must be made between the valve actuators 16.1, 17.1 and the washer control 11. In most instances, these connections would have to be made by a washer service man and while the necessary service charge for the operation would not affect the commercial acceptance of the instant device by self-serve laundries since the service charge would be spread over a multiplicity of machines, this would not be true in homes and apartments where but a single machine would be connected at each service call. It is to obviate the necessity of having a service man make the installation that the following structure has been devised.

As fragmentarily seen in FIGURE 3 where corresponding parts are identified by the same reference characters as before but with the suffix a added, the power cord 24 of the washing machine terminates in a plug 25 which is designed to be inserted into an electrical outlet 26 which provides the electrical power source for the washer. In this embodiment, the necessary electrical connections for valve actuator leads 18a (which correspond to the leads 18) is simplicity itself since the washer plug 25 need only be withdrawn from the outlet 26, an adaptor 27 inserted into the outlet 26, and the plug 25 then inserted into the adaptor. Since the leads 18a extend to the valve actuators 16.1, 17.1a, all necessary electrical connections are thus complete.

In the schematic representation of FIGURE 4, it will be seen that the adaptor 27 is provided with prongs 28, 29 for reception in respective sockets 30, 31 of the outlet 26 and with sockets 32, 33 constituting an outlet for receiving the respective prongs of the plug 26. As herein shown, a conductor 34 extends between the adaptor prong 29 and its socket 33 while the leads 18a extend between the prong 28 and the socket 32 to dispose the valve actuators 16.1a, 17.1a in series between adaptor prong 28 and socket 32.

With the adaptor prongs inserted in the outlet 26 and the plug 25 inserted in the outlet provided by the adaptor, it will be understood that when the washer is not in operation, no current will flow to the washer from the power lines L–1, L–2 through the adaptor 27 because there is not a completed electrical circuit through the washer. Consequently, valve actuators 16.1a, 17.1a will be de-energized and thus the valves controlled thereby will be closed so that the washer supply hoses are not continually subjected to water pressure.

When, however, the usual washer control is actuated to initiate operation of the washer, a complete electrical circuit therethrough will be established resulting in current flow between power lines L–1, L–2 via the outlet socket 30, adaptor prong 28, leads 18a and valve actuators 16.1a, 17.1a, adaptor socket 33, conductor 34, adaptor prong 29, and outlet socket 31. With electrical energy flowing through valve actuators 16.1a, 17.1a, the valves controlled thereby will open thus allowing water to flow to the washer supply hoses previously described and thence to the washer in accordance with its operating cycle. When the washer completes its cycle and shuts itself off, the previously described electrical circuit through the washer will be broken thereby interrupting current flow through the valve actuators 16.1a, 17.1a and once again closing the respective valves controlled thereby.

In the embodiment of FIGURE 5 wherein corresponding parts are identified by the same reference characters as before but with the suffix b added, adaptor 27b encloses a relay 35 having an operating coil 36, and normally open contacts 37. Coil 36 is interposed in a series circuit 38 between the adaptor prong 28b and the adaptor socket 32b while the valve actuators 16.1b, 17.1b are shunted across the prong side of circuit 38 and the conductor 34b through the contacts 37 via the leads 18b.

In the normal position of parts shown wherein the washer is assumed to be off, no current is flowing through coil 36, contacts 37 are open, and therefore valve actuators 16.1b, 17.1b are de-energized. When, however, the washer is turned on, current will flow through the coil 36 thus closing the contacts 37 and energizing the valve actuators 16.1b, 17.1b. When the washer completes its operational cycle, current flow through the coil 36 will cease, contacts 37 will open, and the valve actuators 16.1b, 17.1b will be de-energized.

In the embodiment of FIGURE 6 wherein corresponding parts are identified by the same reference characters as before but with the suffix c added, adaptor 27c encloses a transformer 39 having a primary 40 and a secondary 41. As illustrated, the primary 40 is in series circuit with the adaptor prong 28c and the socket 32c while the secondary is in series with the valve actuators 16.1c, 17.1c.

With the washer off, no current will flow through the transformer primary 40 nor the transformer secondary 41 and thus the valve actuators 16.1c, 17.1c, will be de-energized. When, however, the washer is turned on, the usual alternating current will flow through the transformer primary thus inducing current flow in its secondary in a manner well-known in the art. Current flow in the secondary, of course, will energize the valve actuator 16.1c, 17.1c. When the washer shuts off and ceases to draw current, flow of current through the primary 40 will terminate along with the current induced in the secondary. With termination of secondary current, the valve actuators 16.1c, 17.1c will once again be de-energized. It will be appreciated that the construction of FIGURE 6 is advantageous in that transformer 39 may be so designed that the voltage induced in the secondary is far lower than that flowing through the primary. Accordingly, the valve actuators may be of low voltage type to eliminate a potential shock hazard in the area of the valves with which they are associated.

While the present disclosure and claims refer to use of the invention with clothes washers, it is to be understood that this is for illustration only and that the invention is equally adapted for use with, for example, portable dishwashers or like devices connected to a source of water pressure by a flexible conduit.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. A safety device for use with an appliance adapted to be connected to a source of pressurized water by a flexible conduit and having an electrical lead terminating in a plug for insertion in an electrical outlet which provides a source of electrical energy for operating such appliance, the improvement comprising:
- a valve interposed between said source of water and said flexible conduit to control water flow therebetween and said valve having an electrical actuator which opens said valve to provide for water flow therethrough only when said actuator is energized, and
- an adaptor interposed between said appliance plug and said outlet and at least in part providing an electrical circuit therebetween, said valve actuator being electrically connected to said adaptor and said actuator being energized from said source only when electrical energy flows to said appliance from said outlet through said adaptor.

2. The construction of claim 1 wherein said adaptor in part encloses a pair of electrical circuits, one of such circuits being in series relation with said appliance and the other of such circuits being in series relation with said valve actuator.

3. The construction of claim 1 wherein said adaptor establishes a series electrical connection between said appliance and said valve actuator thereby effecting energization of the latter when electrical energy flows to said appliance through said adaptor.

4. The construction of claim 1 and further comprising a transformer having its primary windings in series relation with said appliance through said adaptor and having its secondary windings in series relation with said valve actuator whereby flow of electrical energy to said appliance through said transformer primary induces flow of electrical energy in said transformer secondary and through said valve actuator.

5. The construction of claim 1 and further comprising an electrically actuated switch device whose actuator portion is in series relation with said appliance and whose switch portion is in series relation with said valve actuator whereby flow of electrical energy to said appliance through said switch actuator portion effects flow of electrical energy to said valve actuator.

References Cited
UNITED STATES PATENTS 2,480,827 9/1949 Armstrong.
3,372,236 3/1968 Schwartz.
3,417,782 12/1968 Mentnech _____ 137—624.11

ALAN COHAN, Primary Examiner

U.S. Cl. X.R.

134—58; 137—607, 624.11